United States Patent
Ueda et al.

(10) Patent No.: US 6,898,964 B2
(45) Date of Patent: May 31, 2005

(54) FAILURE DETERMINATION METHOD FOR AN AIR SUPPLY SYSTEM IN A FUEL CELL APPARATUS

(75) Inventors: Kenichiro Ueda, Utsunomiya (JP); Junji Uehara, Utsunomiya (JP); Shinji Yoshikawa, Utsunomiya (JP); Yoshikazu Murakami, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 2 days.

(21) Appl. No.: 10/723,708

(22) Filed: Nov. 25, 2003

(65) Prior Publication Data

US 2004/0159147 A1 Aug. 19, 2004

(30) Foreign Application Priority Data

Nov. 28, 2002 (JP) ..................... P2002-346130

(51) Int. Cl.⁷ ............................ G01M 17/00
(52) U.S. Cl. ........................................ 73/112
(58) Field of Search ................. 73/112, 113, 116, 73/117.2, 117.3, 118.1; 701/29

(56) References Cited

U.S. PATENT DOCUMENTS 6,755,077 B2 * 6/2004 Clingerman et al. .......... 73/116
2001/0028970 A1 * 10/2001 Sano et al. .................... 429/22
2003/0029224 A1 * 2/2003 Pratt et al. .................... 73/23.2
2003/0211373 A1 * 11/2003 Ueda et al. .................... 429/24
2003/0226399 A1 * 12/2003 Clingerman et al. ....... 73/119 A
2004/0247962 A1 * 12/2004 Toukura ....................... 429/22

FOREIGN PATENT DOCUMENTS

JP        6-260195        9/1994

* cited by examiner

*Primary Examiner*—Eric S. McCall
(74) *Attorney, Agent, or Firm*—Lahive & Cockfield, LLP; Anthony A. Laurentano, Esq.

(57) ABSTRACT

An oxidizing agent supply system failure determination method for a fuel cell for use with a fuel cell apparatus provided with a fuel cell that is supplied with a fuel and an oxidizing agent, and an oxidizing agent supply system that has an oxidizing agent condition adjusting means that adjusts condition of the oxidizing agent supplied to the fuel cell, comprising the step of determining that the oxidizing agent supply system has failed if an absolute value of a difference between an actual value of a supply provided by the oxidizing agent condition adjusting means and a first predetermined value that is compared to the actual value is equal to or greater than a second predetermined value and a predetermined period of time has passed. An oxidizing agent supply system failure determination method for a fuel cell is provided which can maintain the reliability of the fuel cell apparatus.

4 Claims, 4 Drawing Sheets

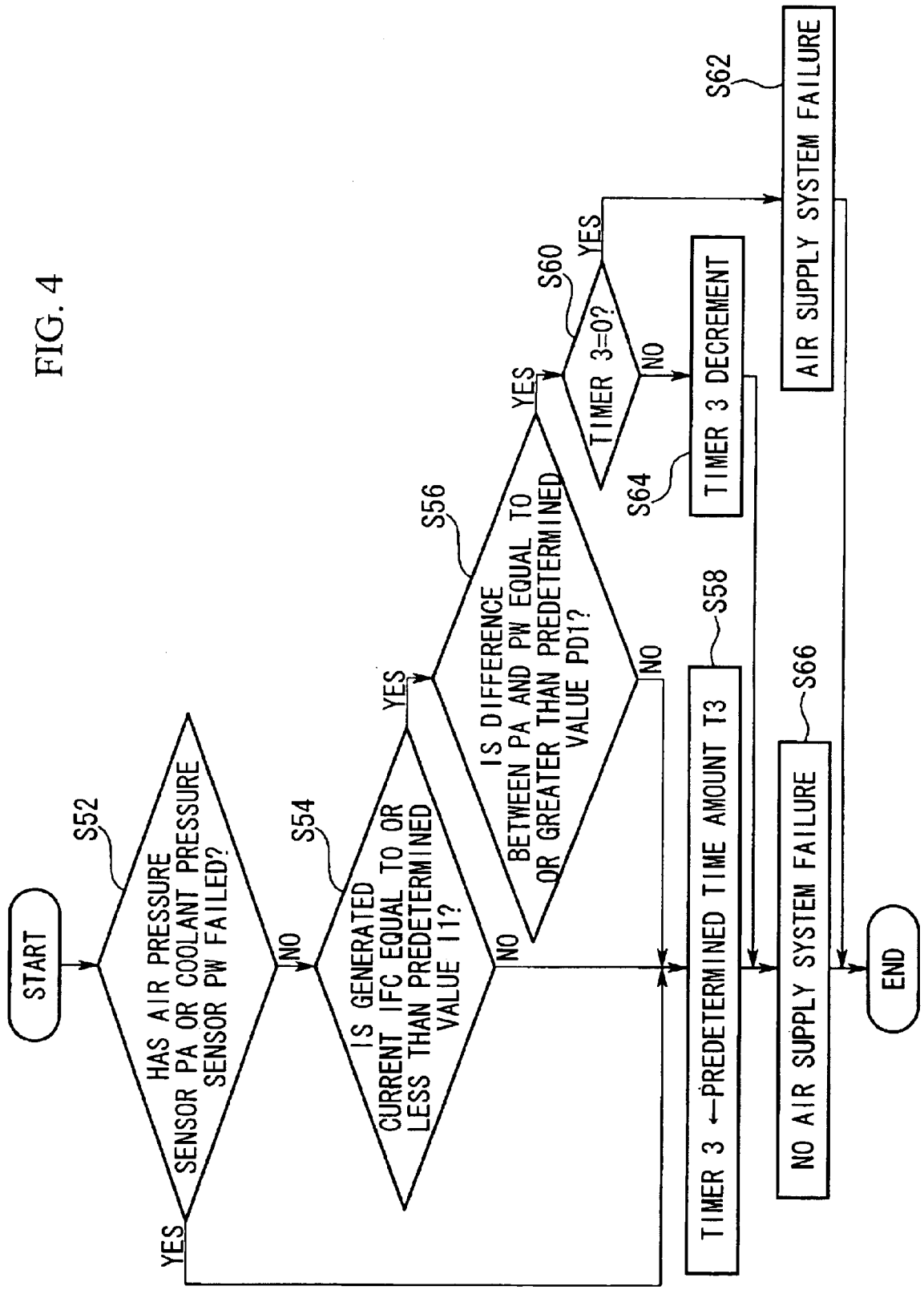

FAILURE DETERMINATION METHOD FOR AN AIR SUPPLY SYSTEM IN A FUEL CELL APPARATUS

BACKGROUND OF THE INVENTION

1. Field of the Invention

The present invention relates to an air supply system failure determination method in a fuel cell apparatus used, for example, in a fuel cell vehicle.

2. Description of the Related Art

In a fuel cell mounted, for example, in a fuel cell vehicle, an anode is provided on one side of a solid polymer electrolyte membrane and a cathode is provided on the other side, a fuel gas (for example, hydrogen gas) is supplied to the anode, an oxidizing gas (for example, oxygen or air) is supplied to the cathode, and chemical energy from the oxidation-reduction reaction between these gases is extracted as direct electrical energy.

There is a fuel cell apparatus using this type of fuel cell that realizes early discovery of abnormalities by detecting the fluctuation in the composition of the reformed gas supplied to the fuel electrode of the fuel cell (refer to Citation 1, Japanese Unexamined Patent Application, First Publication No. Hei 6-260195).

However, in this fuel cell, when the air supply system fails, supplying air having a flow rate and pressure suitable for generation of electricity to the fuel cell becomes difficult, and thus carrying out appropriate detection of air supply system failure is very important in terms of maintaining the reliability of the fuel cell apparatus.

In consideration of the above-described problems, it is an object of the present invention to provide a fuel cell apparatus that can reliably detect the failure of the air supply system, and can maintain the reliability of the fuel cell apparatus.

In order to attain the object described above, according to the present invention, there is provided an oxidizing agent supply system failure determination method for a fuel cell for use with a fuel cell apparatus provided with a fuel cell that is supplied with a fuel and an oxidizing agent, and an oxidizing agent supply system that has an oxidizing agent condition adjusting means that adjusts condition of the oxidizing agent supplied to the fuel cell, comprising the step of: determining that the oxidizing agent supply system has failed if an absolute value of a difference between an actual value of a supply provided by the oxidizing agent condition adjusting means and a first predetermined value that is compared to the actual value is equal to or greater than a second predetermined value and a predetermined period of time has passed.

According to this invention, because the determination is carried out based on the fact that when the oxidizing agent supply system is normal, the absolute value of the difference between the actual value of the supply provided by the oxidizing agent condition adjusting means and the first predetermined value that is compared to the actual value is controlled within a predetermined time and within a predetermined value, it is possible to detect appropriately that there has been a failure in the oxidizing agent supply system, and thereby, it becomes possible to take appropriate measures that depend on the failure, and thereby maintaining the reliability of the fuel cell apparatus can be realized.

Preferably, the oxidizing agent condition adjusting means comprises a flow rate adjusting means that adjusts a flow rate of the oxidizing agent supplied to the fuel cell, and the actual value is an actual flow rate of the oxidizing agent which the flow rate adjustment means supplies and the first predetermined value is a command value sent to the flow rate adjusting means.

According to this invention, because the determination is carried out based on the fact that when the oxidizing agent supply system is normal, the absolute value of the difference between the actual flow rate of the oxidizing agent and the command value sent to the flow rate adjusting means is controlled within a predetermined time and a predetermined value, it is possible to determine properly the failure of the oxidizing agent supply system, and thereby, it becomes possible to take appropriate measures that depend on the failure, and thereby maintaining the reliability of the fuel cell apparatus can be realized.

Preferably, the oxidizing agent condition adjusting means comprises a pressure adjusting means that adjusts pressure of the oxidizing agent supplied to the fuel cell, and the actual value is an actual pressure of the oxidizing agent which the pressure adjusting means supplies and the first predetermined value is a command value sent to the pressure adjusting means.

According to this invention, because the determination is carried out based on the fact that when the oxidizing agent supply system is normal, the absolute value of the difference between the actual pressure of the oxidizing agent and the command value sent to the pressure adjusting means is controlled within a predetermined time and a predetermined value, it is possible to determine properly the failure of the oxidizing agent supply system, and thereby, it becomes possible to take appropriate measures that depend on the failure, and thereby maintaining the reliability of the fuel cell apparatus can be realized.

Preferably, the fuel cell apparatus further comprises a cooling system that cools the fuel cell, and the oxidizing agent condition adjusting means comprises a flow rate adjusting means that adjusts a flow rate of the oxidizing agent supplied to the fuel cell, and the actual value is an actual flow rate of the oxidizing agent which the flow rate adjusting means supplies and the first predetermined value is a pressure of a cooling medium supplied to the cooing system, and it is determined that the oxidizing agent supply system has failed if a state in which a generated current of the fuel cell is equal to or less than a predetermined value and the absolute value of a difference between the actual flow rate and a pressure of the cooling medium is equal to or greater than the second predetermined value has passed a predetermined period of time.

According to this invention, because the determination is carried out based on the fact that when the oxidizing agent supply system is normal, the state in which the generated current of the fuel cell is equal to or less than a predetermined value and the absolute value of the difference between the actual flow rate and the pressure of the cooling medium is equal to or greater than the second predetermined value is controlled within a predetermined time, it is possible to determine properly the failure of the oxidizing agent supply system, and thereby, it becomes possible to take appropriate measures that depend on the failure, and thereby maintaining the reliability of the fuel cell apparatus can be realized.

The above and other objects and features of the present invention will become more apparent from the following description taken in conjunction with the accompanying drawings.

BRIEF DESCRIPTION OF THE DRAWINGS

FIG. 4 is a flowchart showing the air supply system failure determination control in the fuel cell apparatus shown in FIG. 1.

PREFERRED EMBODIMENTS OF THE INVENTION

An embodiment of the present invention will now be described with reference to FIG. 1.

Figure 1:
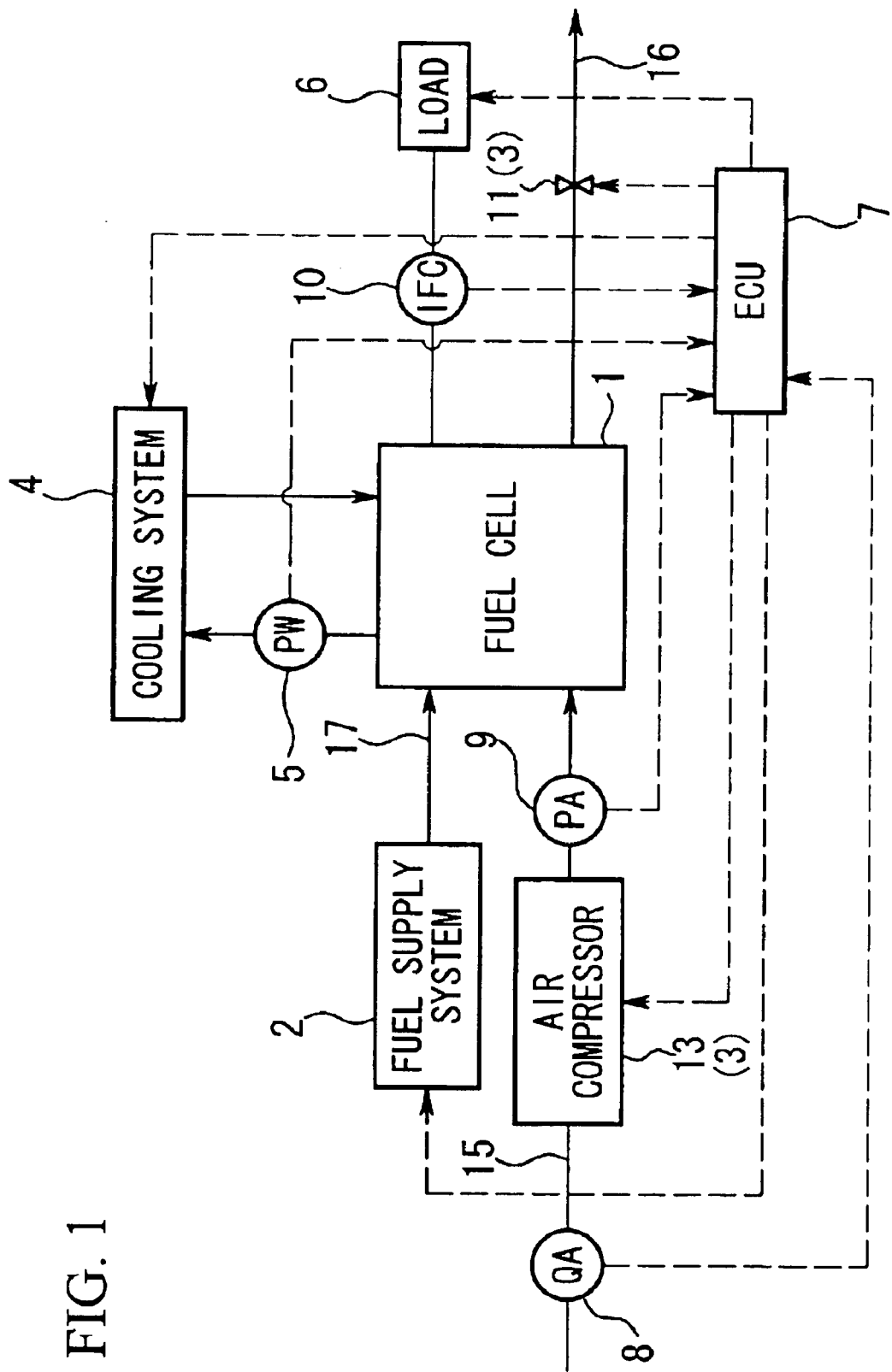
FIG. 1 is a schematic diagram showing the fuel cell apparatus applied to the present invention.

FIG. 1 is a schematic diagram of the fuel cell apparatus applied in the present invention.

A fuel cell 1 is made up of a stack constructed by stacking a plurality of cells, where each cell is formed by sandwiching a solid polymer electrolyte membrane between an electrode on one side and a cathode on the other. The solid polymer electrolyte membrane is made, for example, of a solid polymer ion exchange membrane or the like.

A fuel supply system 2 is connected to the fuel cell 1 via a fuel supply path 17. The fuel supply system 2 is provided with a fuel supply source that stores the fuel (for example, hydrogen gas), and the oxygen gas is supplied from this supply source to the anode of the fuel cell 1 via the fuel supply path 17.

In addition, an air supply system 3 is connected to the fuel cell 1 via an air supply path 15. The air supply system 3 is provided with an air compressor 13, and the air (oxidizing gas) is supplied to the cathode of the fuel cell 1 from the air compressor 13 via the air supply path 15.

In the fuel cell 1, when hydrogen gas is supplied to the anode as a fuel and air that includes oxygen is supplied to the cathode as an oxidizing agent, the hydrogen ions generated by a catalytic reaction in the anode migrate to the cathode by passing through the solid polymer electrolyte membrane and cause an electrochemical reaction with the oxygen at the cathode to thereby generate electricity, and water is generated.

After the air is supplied for the generation of electricity, it is discharged from the cathode of the fuel cell 1 as off gas via an air discharge path 16.

A pressure control valve (back pressure valve) 11 is provided on the air discharge path 16. The pressure of the air supplied to the fuel cell 1 is controlled by adjusting the aperture of the pressure control valve 11.

An airflow rate sensor 8 and an air pressure sensor 9 are provided on the air supply path 15. The airflow rate sensor 8 is for detecting the rate of the flow of the air supplied to the fuel cell 1 from the compressor 13. In addition, the air pressure sensor 9 is for detecting the pressure of the air supplied to the fuel cell 1. As will be described below, the condition of the air supply system 3 is determined based on the airflow rate and the air pressure detected at these sensors 8 and 9. This air supply system 3 is constructed by being provided with the air supply path 15, the air discharge path 16, the air compressor 13, and the pressure control valve 11.

Moreover, after hydrogen gas supplied to the fuel cell 1 has been used to generate electricity, the unreacted hydrogen gas is discharged as hydrogen off gas to a hydrogen off gas circulation path (not shown) from the anode of the fuel cell 1, and is supplied again to the anode of the fuel cell 1.

A cooling system 4 is connected to the fuel cell 1. The cooling system 4 is provided with a pump for circulating a cooling medium and the like to supply the cooling medium (for example, a cooling medium such as water) between the cells of the fuel cell 1. Thus, by circulating the cooling medium in the fuel cell 1, a rise in the temperature of the fuel cell 1 due to heat production during electricity generation can be suppressed, and the fuel cell 1 can be operated at a suitable temperature. In addition, a cooling medium pressure sensor 5 is connected to the cooling system 4, and the pressure of the cooling medium supplied to the fuel cell 1 is detected by the cooling medium pressure sensor 5.

In addition, a load (for example, a motor or an air conditioner) 6 is connected to the fuel cell 1, and electrical power generated by the fuel cell 1 is supplied to the load 6. Additionally, a current sensor 10 is provided on the path that connects the fuel cell 1 and the load 6, and the generated current IFC supplied from the fuel cell 1 to the load 6 is detected by the current sensor 10

In addition, the fuel cell apparatus is provided with a control apparatus (ECU: Electric Control Unit) 7, and the devices described above are controlled by the ECU 7. That is, the ECU 7 carries out control of the systems 2, 3, and 4 and the load 6 based on each of the detected values (cooling medium pressure PW, the airflow rate QA, the air pressure PA, and the generated current IFC) at the sensors 5, 8, 9, and 10. Among the controls that are carried out by the ECU 7, the failure determination control of the air supply system 3 is explained with reference to FIGS. 2 through 4.

Figure 2:
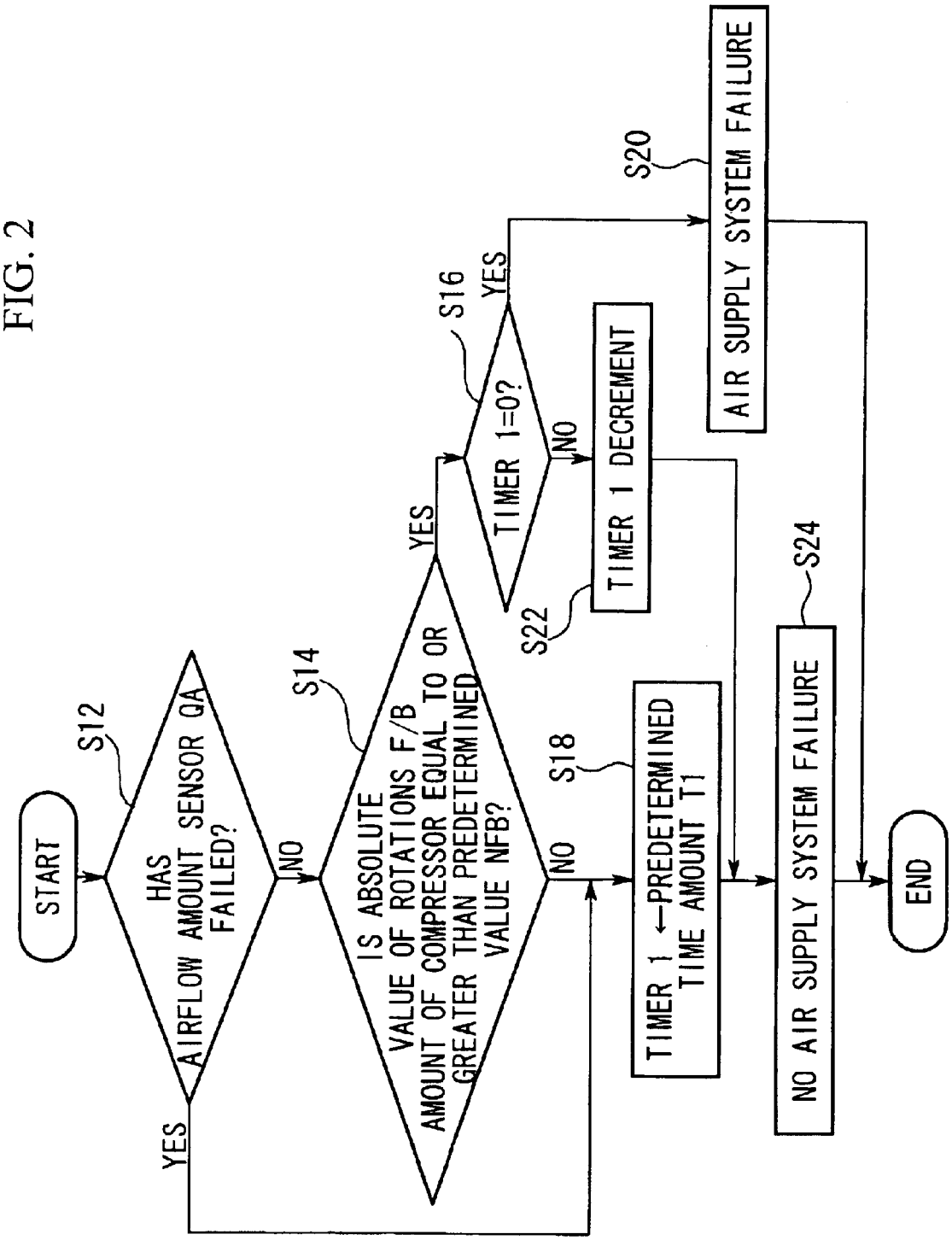
FIG. 2 is a flowchart showing the air supply system failure determination control in the fuel cell apparatus shown in FIG. 1.

FIG. 2 is a flowchart showing the air supply system failure determination control in the fuel cell apparatus shown in FIG. 1. First, in step S 12, whether or not the airflow rate sensor 8 has failed is determined. In the case that the result of the determination in step S 12 is NO (the case wherein the sensor 8 is operating normally), the air supply system failure determination processing in step S 14 is carried out. In the case that the result of the determination in step S 12 is YES (the case that the sensor 8 has failed), the processing proceeds to step S 18 without carrying out the failure determination processing in step S 14. In this manner, by carrying out the failure determination only in the case that the airflow rate sensor 8 has been determined to be operating normally, it is possible to reliably determine the condition of the air supply system 3. The failure determination of the airflow rate sensor 8 can be carried out depending on the state of the signal voltage detected at the sensor 8. In addition, it is possible to carry out the detection of damage in the other sensors 9 and 5 described below in the same manner.

In step S 14, whether or not the absolute value of the feedback amount of the command value of the rotations of the air compressor 13 (the difference between the rotations and the command value) is equal to or greater than a predetermined value (determination reference value) NFB is determined. The rotations are calculated based on the flow rate QA detected by the flow rate sensor 8. Note that the rotations of the air compressor 13 can be directly detected as well.

If the result of the determination in step S 14 is YES, the processing proceeds to step S 16, and in the case that the result of the determination in step S 14 is NO, the processing proceeds to step S 18.

In step S 18, a predetermined amount of time (the failure determination time) T1 is set in a failure determination timer 1. In addition, it is determined in step S 24 that there is no air supply system failure, and the processing sequence ends.

In step S 16, whether or not the set amount of time of the failure determination timer 1 is O is determined. If the result of the determination is YES, the processing proceeds to step S 20, and if the result of the determination is NO, the processing proceeds to step S 22. In step S 22, the set amount of time of the timer 1 is decremented for a predetermined period of time. Then the processing proceeds to step S 24, and the processing sequence ends. In this manner, a continuation time is measured after the absolute value has become equal to or greater than the predetermined value NFB.

In addition, when the timer 1 has become 0, in step S 20, it is determined that the air supply system 3 has failed, and the processing sequence ends. In this manner, because the determination is carried out based on the fact that when the air supply system 3 is normal, the rotations of the compressor 13 are controlled within a predetermined time and a predetermined value with respect to the command value, it is possible to determine properly the failure of the air supply system 3. That is, in this flowchart, in the case that it is determined that the air supply system 3 has failed, because it is possible to specify the cause, such a blockage of the air in the paths 15 and 16, an abnormality of the airflow upstream of the airflow rate sensor 8, or an abnormality of the compressor 8, it is possible to realize maintaining of the reliability of the fuel cell apparatus by implementing a measures to resolve the failure of these parts.

Figure 3:
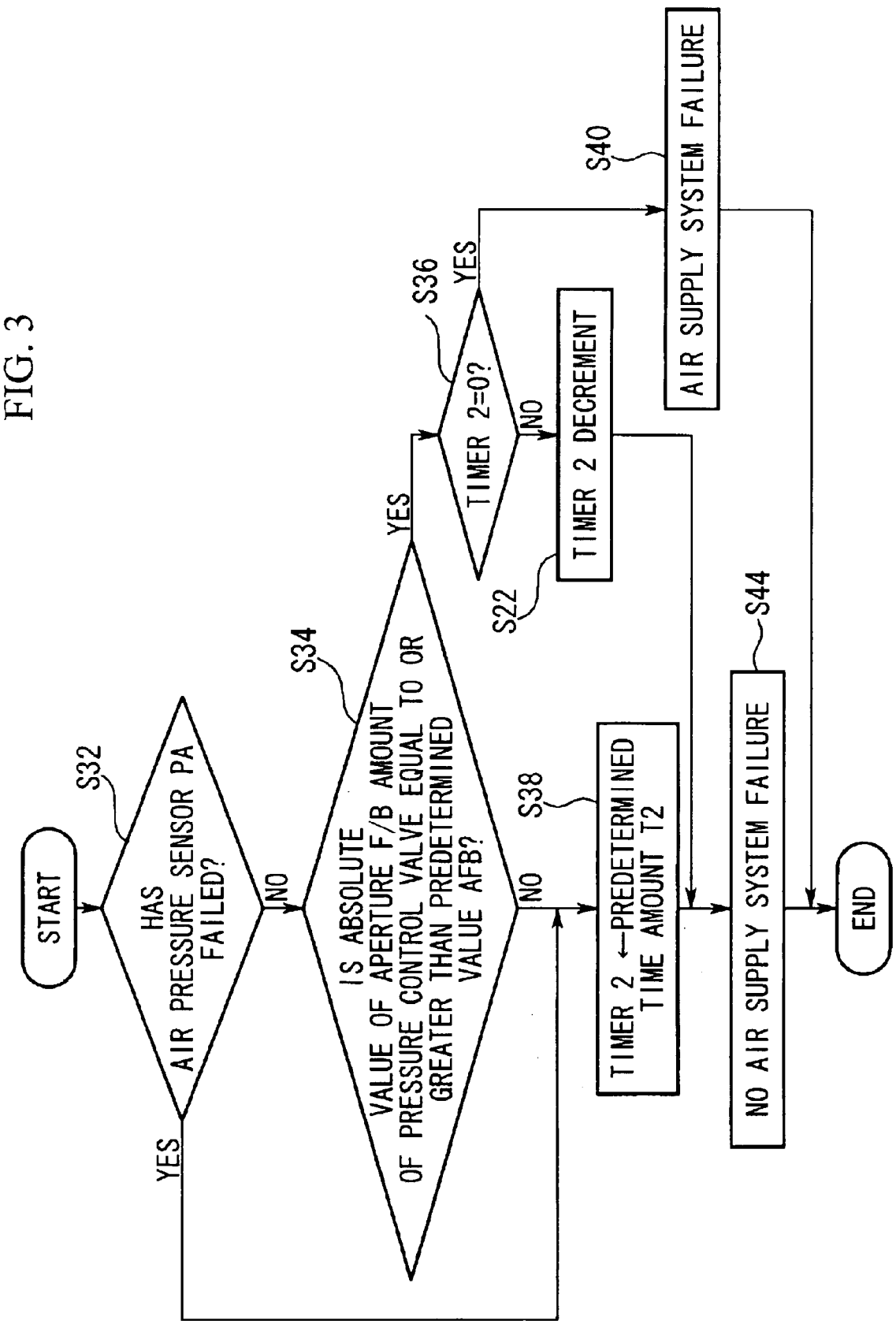
FIG. 3 is a flowchart showing the air supply system failure detection control in the fuel cell apparatus shown in FIG. 1.

FIG. 3 is another flowchart showing the air supply system failure determination control in the fuel cell apparatus shown in FIG. 1. First, in step S 32, it is determined whether or not the air pressure sensor 9 has failed. When the result of the determination in step S 34 is NO (the case in which the sensor 9 is operating normally), the air supply system failure determination processing in step S 34 is carried out. In addition, if the result of the determination in step S 32 is YES (the case in which the sensor 9 has failed), the processing proceeds to step S 38 without carrying out the failure determination processing in step S 34. In this manner, it is possible to determine reliably the condition of the air supply system 3 by carrying out the air supply system failure determination only in the case that the air pressure sensor 9 is determined to be normal.

In step S 34, whether or not the absolute value of the feedback amount with respect to the command value of the aperture of the pressure control valve 11 (the difference between the aperture and the command value) is equal to or greater than a predetermined value (determination reference value) AFB is determined. The aperture of the pressure control valve 11 is calculated based on the pressure PA detected by the pressure sensor 9. Note that the aperture of the pressure control valve 11 can be directly detected.

If the result of the determination in step S 34 is YES, the processing proceeds to step S 36, and if the result of the determination in step S 34 is NO, the processing proceeds to step S 38.

In step S 38, a predetermined amount of time (failure determination time) T2 is set in the timer 2 for failure determination. In addition, it is determined in step S 44 that there is no air supply system failure, the processing sequence ends.

In step S 36, whether or not the set amount of time of the failure determination timer 2 is 0 is determined. If the result of the determination is YES, the processing proceeds to step S 40, and if the result of the determination is NO, the processing proceeds to step S 42. In step S 42, the set amount of time of the timer 2 is decremented for a predetermined period of time. Then the processing proceeds to step S 44, and the processing sequence ends. In this manner, the continuation time is measured after the absolute value has become equal to or greater than the predetermined value AFB.

In addition, in the case that the timer 2 has become 0, in step S 40, it is determined that the air supply system 3 has failed, and the processing sequence ends. In this manner, a failure of the air supply system 3 can be appropriately determined because the determination is carried out based on the fact that when the air supply system 3 is normal, the aperture of the pressure control valve 11 is controlled within a predetermined period of time and within a predetermined value with respect to the command value. Thereby, it becomes possible to take appropriate measures depending on the failure. That is, in this flowchart, in the case that it has been determined that the air supply system 3 has failed, because it is possible to specify the cause, for example, a blockage of the paths 15 and 16 of the air downstream of the air pressure sensor 9, an abnormality of the air flow upstream of the pressure control valve 11, or an abnormality of the pressure control valve 11, it is possible to implement measures to resolve the failure of these parts. Thereby, it is possible to realize maintaining the reliability of the fuel cell apparatus.

FIG. 4 is a flowchart showing the air supply system failure determination control in the fuel cell apparatus shown in FIG. 1. First, in step S 52, whether or not the air pressure sensor 9 or the cooling medium pressure sensor 5 has failed is determined. If the result of the determination in step S 52 is NO (the case where the sensors 9 and 5 are operating normally), the processing proceeds to step S 54. If the result of the determination in step S 52 is YES (the case where either of the sensors 9 or 5 has failed), the processing proceeds to step 58 without carrying out the air supply system failure determination processing which will be described below. In this manner, the failure determination is not carried out when it has been determined that there was a failure of either the air pressure sensor 9 or the cooling medium pressure sensor 5. Thereby, it is possible to prevent a determination error due to the failure of the sensors 9 and 5.

In step S 54, whether or not the generated current IFC of the fuel cell 1 detected by the current sensor 10 is equal to or less than a predetermined value 11 is determined. If the result of the determination in step S 54 is YES, the processing proceeds to the failure determination processing in step S 56, and if the result of the determination in step S 54 is NO, the processing proceeds to step S 58 without carrying out the failure determination processing in step S 56. If the generated current IFC is large, the airflow rate supplied to the fuel cell 1 is increased, and as a result the difference between the air pressure and the cooling medium pressure becomes large. This is in order to prevent a determination error in this case.

In step S 56, whether or not the difference between the air pressure PA and the cooling medium pressure PW is equal to or greater than a predetermined value (the determination reference value) PD1 is determined. If the result of the determination is YES, the processing proceeds to step S 60, and if the result of the determination is NO, the processing proceeds to step S 58.

In step S 58, the set amount of time in the failure determination timer 3 is set to a predetermined time T3. Then, it is determined in step S 66 that there is no air supply system failure, and the processing sequence ends.

In step S 60, whether or not the set amount of time of the failure determination timer 3 is 0 is determined. If the result of the determination is YES, the processing proceeds to step S 62, and if the result of the determination is NO, the processing proceeds to step S 64. In step S 64, the set amount of time of the timer 3 is decremented for a predetermined period of time. Then the processing proceeds to step S 64, and the processing sequence ends. In this manner, the continuation time can be measured after the absolute value of the difference between the air pressure PS and the cooling medium pressure PW has become equal to or greater than a predetermined value PD1.

In addition, when the timer 3 has become 0, in step S 62, it is determined that the air supply system 3 has failed, and the processing sequence ends. In this manner, it is possible to determine appropriately the failure of the air supply system 3 by carrying out a determination based on the fact that when the air supply system 3 is normal, the generated current IFC is controlled so as to be equal to or less than a predetermined value, and the absolute value is controlled within a predetermined time and within a predetermined value. Thereby, it becomes possible to take appropriate measures depending on the failure. That is, in the flowchart, in the case it has been determined that there has been a failure of the air supply system 3, it is possible to determine the cause, such as a blockage in the air paths 15 and 16, and thereby it is possible to realize maintaining of the reliability of the fuel cell apparatus by implementing measures to resolve the failure of these parts.

Moreover, the present invention is not limited by the above embodiment. In addition, the fuel cell apparatus can be appropriately used in a fuel cell vehicle, but application to other uses, for example, to motorcycles or robots having mounted fuel cells, or stationary or portable fuel cell apparatuses, is of course possible.

As explained above, according to the present invention, it is possible to determine appropriately the failure of the air supply system and it is possible to realize maintaining the reliability of the fuel cell apparatus.

What is claimed:

1. An oxidizing agent supply system failure determination method for a fuel cell for use with a fuel cell apparatus provided with a fuel cell that is supplied with a fuel and an oxidizing agent, and an oxidizing agent supply system that has an oxidizing agent condition adjusting means that adjusts condition of the oxidizing agent supplied to said fuel cell, comprising the step of:

determining that said oxidizing agent supply system has failed if an absolute value of a difference between an actual value of a supply provided by said oxidizing agent condition adjusting means and a first predetermined value that is compared to said actual value is equal to or greater than a second predetermined value and a predetermined period of time has passed.

2. An oxidizing agent supply system failure determination method for a fuel cell according to claim 1, wherein said oxidizing agent condition adjusting means comprises a flow rate adjusting means that adjusts a flow rate of the oxidizing agent supplied to said fuel cell, and wherein said actual value is an actual flow rate of the oxidizing agent which said flow rate adjustment means supplies, and said first predetermined value is a command value sent to said flow rate adjusting means.

3. An oxidizing agent supply system failure determination method for a fuel cell according to claim 1, wherein said oxidizing agent condition adjusting means comprises a pressure adjusting means that adjusts pressure of the oxidizing agent supplied to said fuel cell, and wherein said actual value is an actual pressure of the oxidizing agent which said pressure adjusting means supplies, and said first predetermined value is a command value sent to said pressure adjusting means.

4. An oxidizing agent supply system failure determination method for a fuel cell according to claim 1, wherein said fuel cell apparatus further comprises a cooling system that cools said fuel cell, and wherein said oxidizing agent condition adjusting means comprises a flow rate adjusting means that adjusts a flow rate of the oxidizing agent supplied to said fuel cell, wherein said actual value is an actual flow rate of the oxidizing agent which said flow rate adjusting means supplies, and said first predetermined value is a pressure of a cooling medium supplied to said cooing system, and wherein it is determined that said oxidizing agent supply system has failed if a state in which a generated current of said fuel cell is equal to or less than a predetermined value and the absolute value of a difference between said actual flow rate and a pressure of said cooling medium is equal to or greater than said second predetermined value has passed a predetermined period of time.

* * * * *